(12) United States Patent
Lee et al.

(10) Patent No.: US 11,584,330 B2
(45) Date of Patent: Feb. 21, 2023

(54) AIRBAG APPARATUS FOR VEHICLE

(71) Applicant: HYUNDAI MOBIS CO., LTD., Seoul (KR)

(72) Inventors: Choong Ryung Lee, Yongin-si (KR); Hae Kwon Park, Yongin-si (KR); Sang Won Hwangbo, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/408,526

(22) Filed: Aug. 23, 2021

(65) Prior Publication Data

US 2022/0063547 A1 Mar. 3, 2022

(30) Foreign Application Priority Data

Sep. 1, 2020 (KR) .................. 10-2020-0111091

(51) Int. Cl.
| | |
|---|---|
| *B60R 21/2338* | (2011.01) |
| *B60R 21/207* | (2006.01) |
| *B60R 21/2342* | (2011.01) |
| *B60R 21/2165* | (2011.01) |
| *B60R 21/233* | (2006.01) |
| *B60R 21/231* | (2011.01) |

(52) U.S. Cl.
CPC ........ *B60R 21/2338* (2013.01); *B60R 21/207* (2013.01); *B60R 21/2165* (2013.01); *B60R 21/233* (2013.01); *B60R 21/2342* (2013.01); *B60R 2021/23107* (2013.01); *B60R 2021/23388* (2013.01)

(58) Field of Classification Search
CPC ............. B60R 21/2338; B60R 21/207; B60R 21/2165; B60R 21/233; B60R 21/2342; B60R 2021/23107; B60R 2021/23388; B60R 21/2176; B60R 21/237; B60R 2021/23538
See application file for complete search history.

(56) References Cited

U.S. PATENT DOCUMENTS

| | | | | |
|---|---|---|---|---|
| 6,439,597 B1* | 8/2002 | Harada | ................. | B60R 21/207 |
| | | | | 280/730.2 |
| 2002/0063452 A1* | 5/2002 | Harada | ................. | B60R 21/207 |
| | | | | 297/216.13 |
| 2006/0113758 A1* | 6/2006 | Tracht | ................. | B60N 2/5825 |
| | | | | 280/730.2 |
| 2006/0113772 A1* | 6/2006 | Tracht | ................. | B60R 21/207 |
| | | | | 280/730.2 |
| 2010/0207363 A1* | 8/2010 | Fredriksson | ......... | B60R 21/207 |
| | | | | 280/730.2 |
| 2013/0257120 A1* | 10/2013 | Tracht | ................. | B60N 2/6009 |
| | | | | 297/216.13 |

(Continued)

FOREIGN PATENT DOCUMENTS

| | | | | |
|---|---|---|---|---|
| CN | 111344188 A | * | 6/2020 | ............. B60N 2/427 |
| EP | 3085584 A1 | * | 10/2016 | ........... B60R 21/201 |

(Continued)

*Primary Examiner* — Drew J Brown
(74) *Attorney, Agent, or Firm* — DLA Piper LLP (US)

(57) ABSTRACT

An airbag apparatus for a vehicle is proposed. The airbag apparatus is configured to protect an occupant from an impact during a vehicle collision, to restrain the occupant to minimize occupant injuries, and to have improved storage performance to reduce a seat package volume.

10 Claims, 9 Drawing Sheets

(56) References Cited

U.S. PATENT DOCUMENTS

| | | | |
|---|---|---|---|
| 2019/0176741 A1* | 6/2019 | Inoue | B60R 21/23138 |
| 2021/0291774 A1* | 9/2021 | Kondou | B60N 2/42718 |
| 2021/0291775 A1* | 9/2021 | Dinsdale | B60R 21/215 |

FOREIGN PATENT DOCUMENTS

| | | | | |
|---|---|---|---|---|
| JP | 2007-084014 | | 4/2007 | |
| JP | 2016007901 A | * | 1/2016 | B60R 21/207 |
| KR | 20210136959 A | * | 11/2021 | |
| WO | WO-2021149534 A1 | * | 7/2021 | |

* cited by examiner

AIRBAG APPARATUS FOR VEHICLE

CROSS REFERENCE TO RELATED APPLICATION

The present application claims priority to Korean Patent Application No. 10-2020-0111091, filed Sep. 1, 2020, the entire contents of which is incorporated herein for all purposes by this reference.

BACKGROUND OF THE INVENTION

Field of the Invention

The present invention relates to an airbag apparatus for a vehicle, which is configured to absorb an impact applied to an occupant in a vehicle collision, to restrain the occupant to minimize occupant injuries, and to have improved storage performance of an airbag cushion to reduce a seat package volume.

Description of the Related Art

In addition to the driving performance, convenience, and functionality of vehicles, technologies are being developed to secure safety of occupants.

Among various safety devices applied to the vehicles, an airbag is applied to a vehicle as the most effective means for protecting the occupant from impact.

The airbag is a means of protecting a driver and occupants in a vehicle collision, and includes a collision sensor detecting a vehicle collision, a controller activating the airbag in response to a detection result of the collision sensor, and an airbag module activating the airbag in response to a signal from the controller. Based on an installation location or a protection target, airbags are classified into a driver's airbag, a passenger's airbag, a side airbag, a roof airbag, and the like, and are applied to a vehicle.

In a side collision, the upper body of the driver and a front passenger are moved, and accordingly, the driver and the front passenger may collide with each other, or the occupants may be injured by colliding with an armrest or a vehicle seat.

In addition, when an occupant is not fastened by a seat belt, the occupant's body is excessively moved forward, and even if a front airbag is deployed, a large impact may be applied to the occupant. Even when the occupant is fastened by the seat belt, the body of the occupant is rotated by inertia and the body is bent, whereby the occupant may receive secondary injuries.

A side airbag is provided to prevent the secondary injuries, and the folded side airbag may appear while protruding to the side of a vehicle seat due to the characteristic of the seat design. When a package of the airbag is not secured at the side of the seat, the exterior of the seat is spoiled by the protruding side airbag The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention is intended to provide an airbag apparatus for a vehicle, the airbag apparatus being configured to protect an occupant from an impact during a vehicle collision, to restrain the occupant to minimize occupant injuries, and to have improved storage performance of an airbag cushion to reduce a seat package volume.

In order to achieve the above objective, according to one aspect of the present invention, there is provided an airbag apparatus for a vehicle, the airbag apparatus including: an airbag cushion provided at a seat frame and configured to be deployed toward a vehicle occupant during a collision; and a cover tether mounted to the seat frame while covering the airbag cushion so that the airbag cushion may be compressed and provided at the seat frame side, the cover tether having a tear line at some section thereof to be torn due to a deployment force of the airbag cushion.

The cover tether may be configured to cover the airbag cushion in a folded state, and of which a first end portion may be removably mounted to a first end portion of the seat frame and a second end portion may be removably mounted to a second end portion of the seat frame.

The seat frame may have a fixation portion at each of the first end portion and the second end portion thereof, and the cover tether may have a locking portion at each of the first end portion and the second end portion thereof, wherein the fixation portion of the seat frame may be lock-connected to the locking portion of the cover tether.

The fixation portion may be bent inward from the seat frame to form a hook shape, and the locking portion may include a coupling hole in which the fixation portion may be inserted.

The fixation portion may be bent inward from the seat frame to form a hook shape, and the locking portion may include a plurality of extended portions respectively formed at the first end portion and the second end portion of the cover tether and extended in a longitudinal direction of the cover tether, the locking portion including a fixation rod arranged across each of the extended portions, and as the extended portions wrap the fixation rod to fix the fixation rod, through holes may be formed between the plurality of extended portions.

The cover tether may include hook portions at the first end portion and the second end portion thereof, respectively, and the cover tether may be lock-connected to the first end portion and the second end portion of the seat frame by the hook portions thereof.

The tear line may be located at a portion spaced apart from the first end portion and the second end portion of the cover tether and be extended across the cover tether in a direction perpendicular to a longitudinal direction of the cover tether.

The cover tether may include: a first tether of which a first end portion may be connected to the seat frame and a second end portion may be connected to the airbag cushion, so that a deployed location of the airbag cushion may be fixed during deployment of the airbag cushion; and a second tether of which a first end portion may be connected to the second end portion of the first tether and a second end portion may be securely mounted to the second end portion of the seat frame, the second tether having the tear line.

The tear line may be arranged in the second tether at a portion adjacent to the first end portion of the second tether, and be extended across the second tether in a direction perpendicular to a longitudinal direction of the cover tether.

The first tether may be in a folded state at a predetermined portion thereof and have a seam portion allowing the folded portion to join, and as the seam portion is torn due to the deployment force of the airbag cushion, an extension length of the first tether may be increased.

The airbag cushion may include a main chamber located at a side of the occupant and a sub chamber located in front of the occupant by being bent from a front end portion of the main chamber during deployment of the airbag cushion, and the first tether may be connected to both the main chamber and the sub chamber and be configured to be located above an upper body of the occupant during deployment of the airbag cushion.

The airbag apparatus for a vehicle, which is configured as described above, can protect the occupant from an impact during a vehicle collision, restrain the occupant to minimize occupant injuries, and have improved storage performance of the airbag cushion to reduce the seat package volume.

BRIEF DESCRIPTION OF THE DRAWINGS

The above and other objectives, features, and other advantages of the present invention will be more clearly understood from the following detailed description when taken in conjunction with the accompanying drawings, in which.

DETAILED DESCRIPTION OF THE INVENTION

Hereinbelow, an airbag apparatus for a vehicle according to preferred embodiments of the present invention will be described with reference to accompanying drawings.

Figure 1:
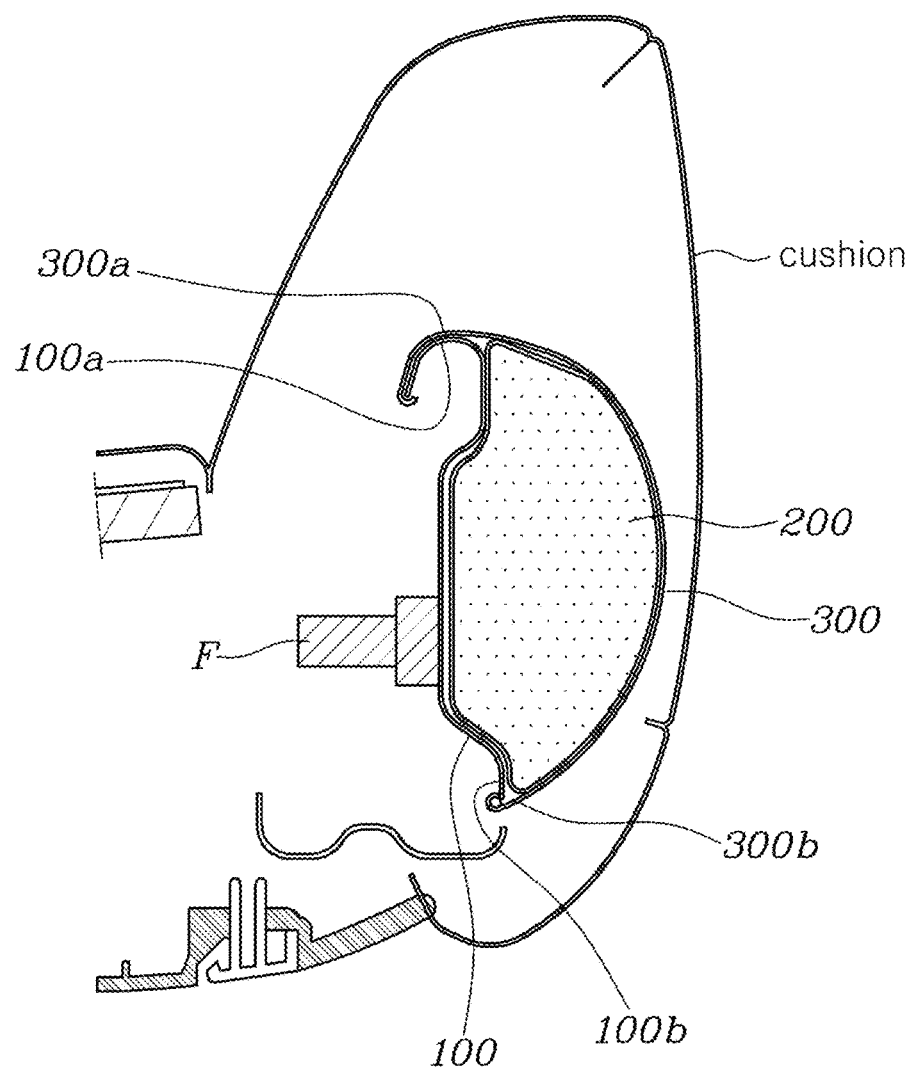
FIG. 1 is a view showing an airbag apparatus for a vehicle according to the present invention.
Figure 2:
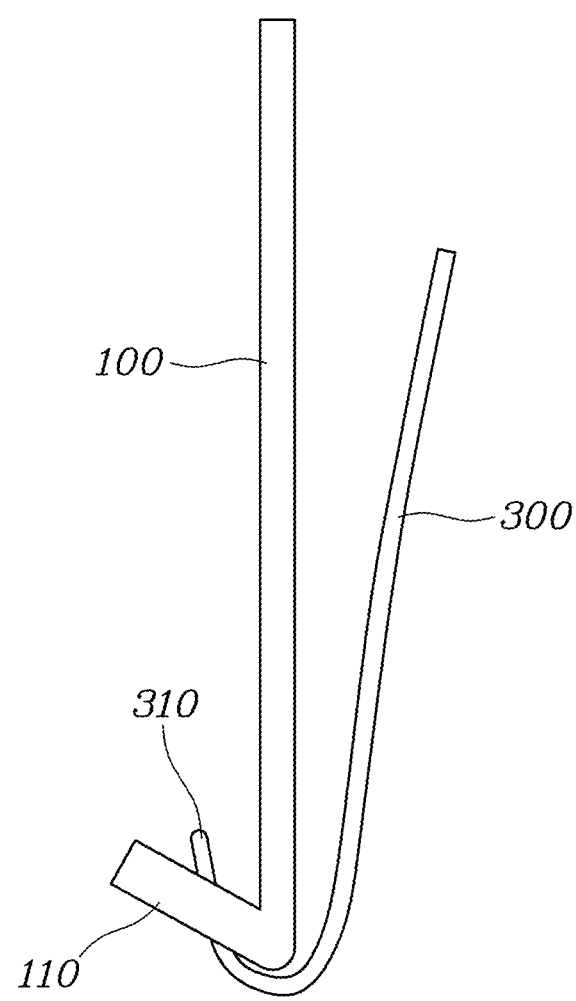
FIGS. 2 and 3 are views showing a cover tether fixation structure according to a first embodiment.
Figure 3:
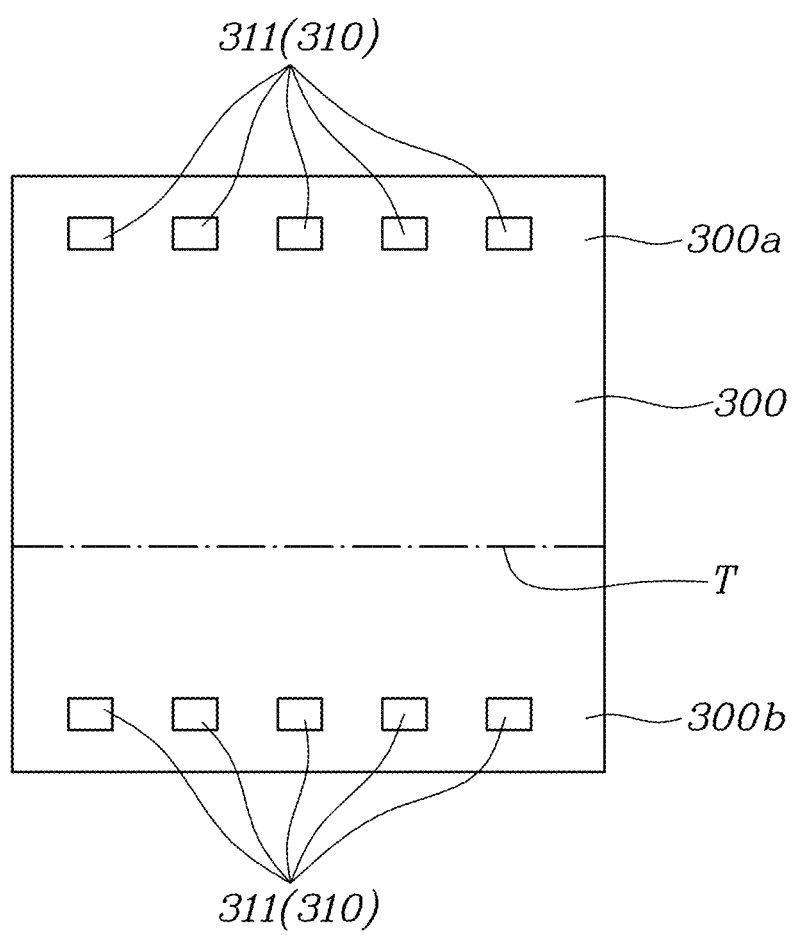
Figure 4:
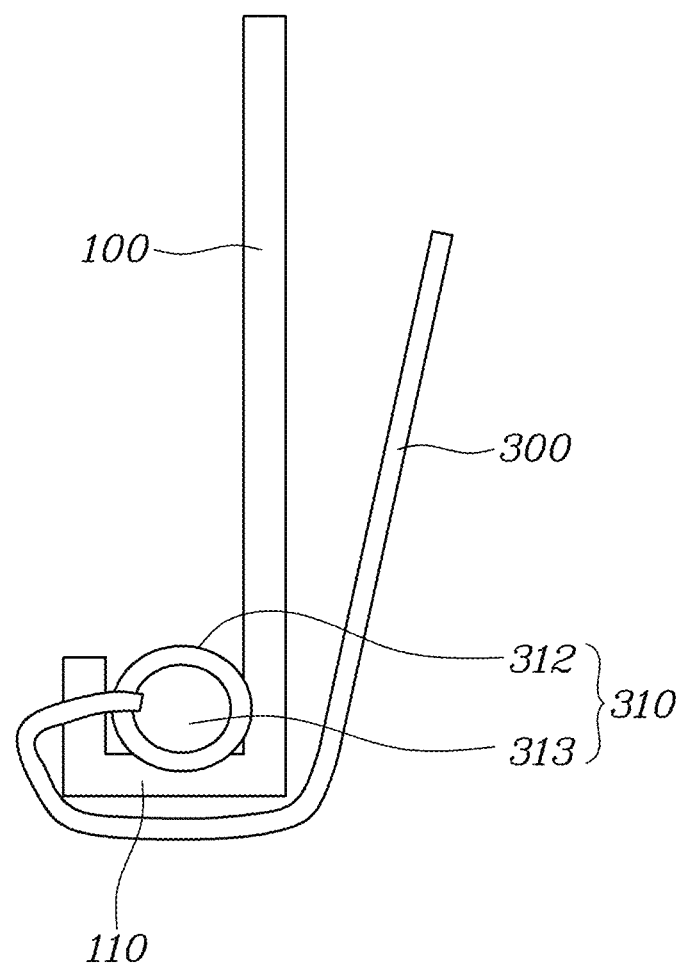
FIGS. 4 and 5 are views showing a cover tether fixation structure according to a second embodiment.
Figure 5:
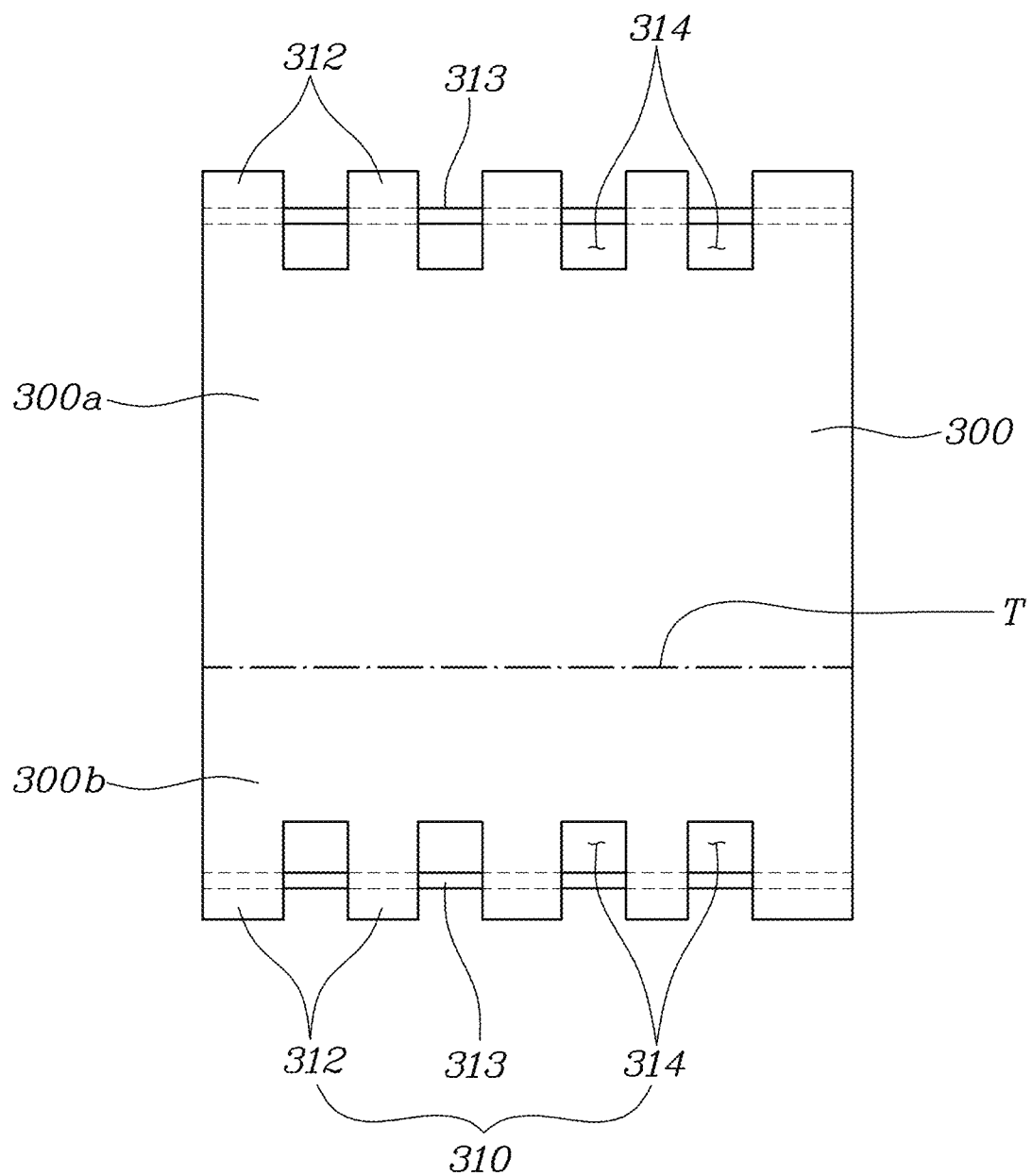
Figure 6:
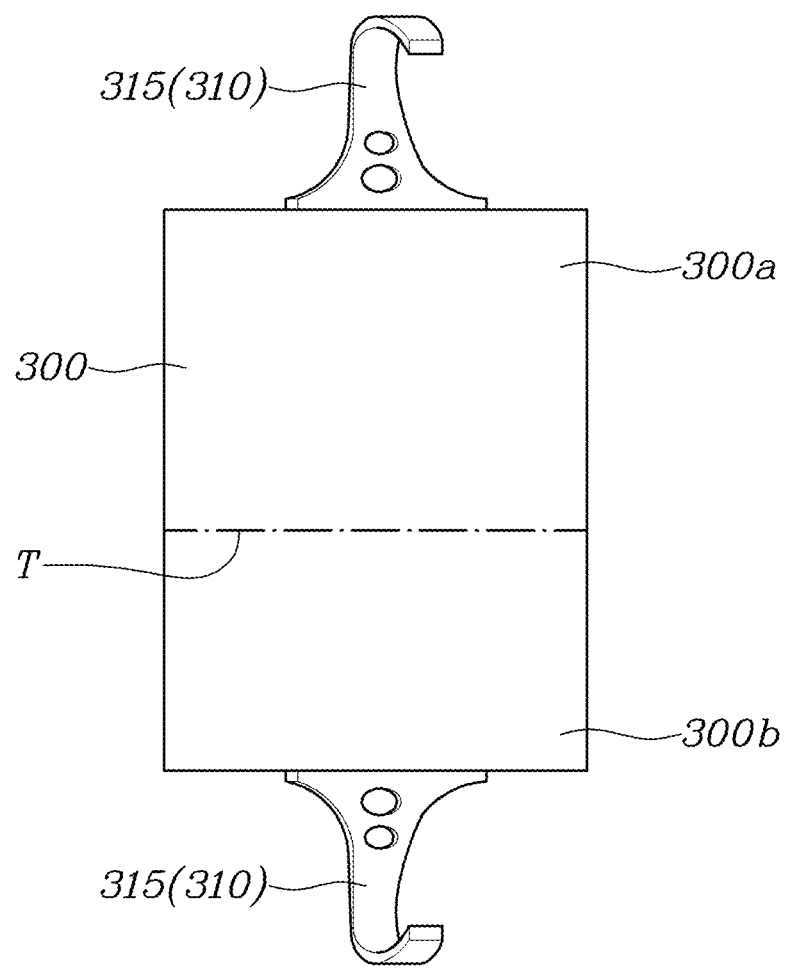
FIG. 6 is a view showing a cover tether fixation structure according to a third embodiment.
Figure 7:
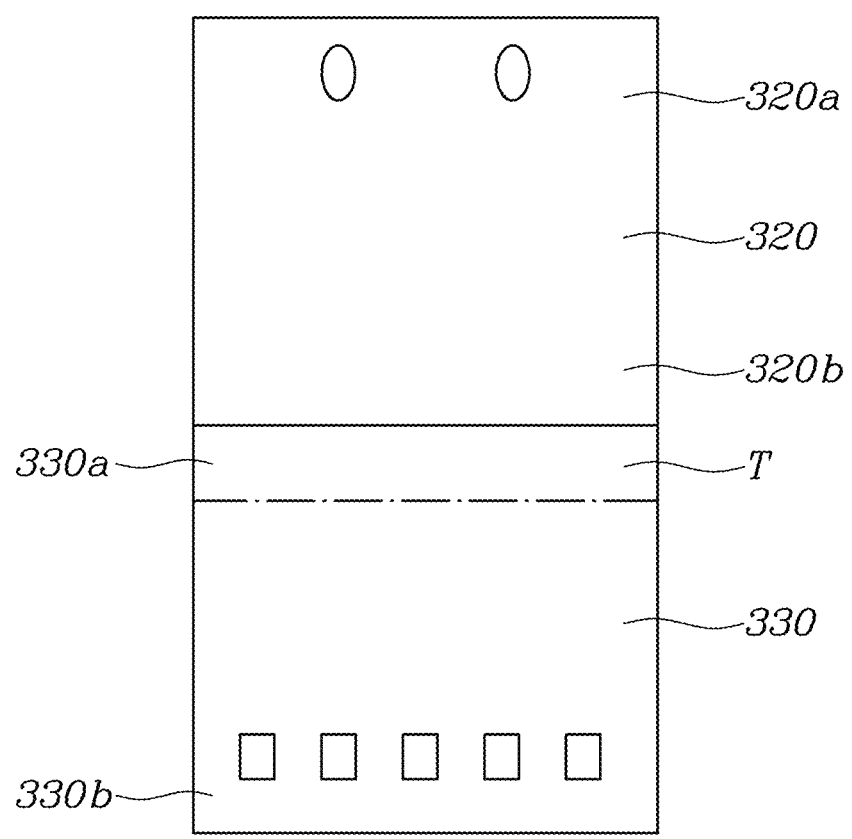
FIG. 7 is a view showing an airbag apparatus for a vehicle according to another embodiment of the present invention.
Figure 8:
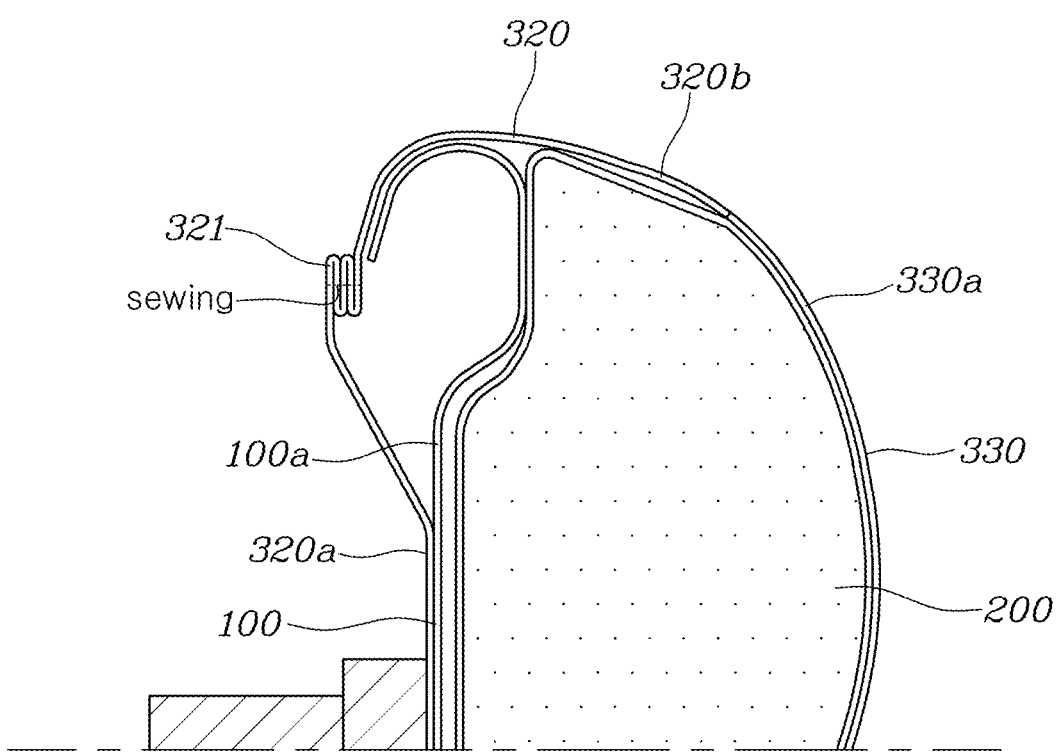
FIG. 8 is a view showing the airbag apparatus for a vehicle in FIG. 7.
Figure 9:
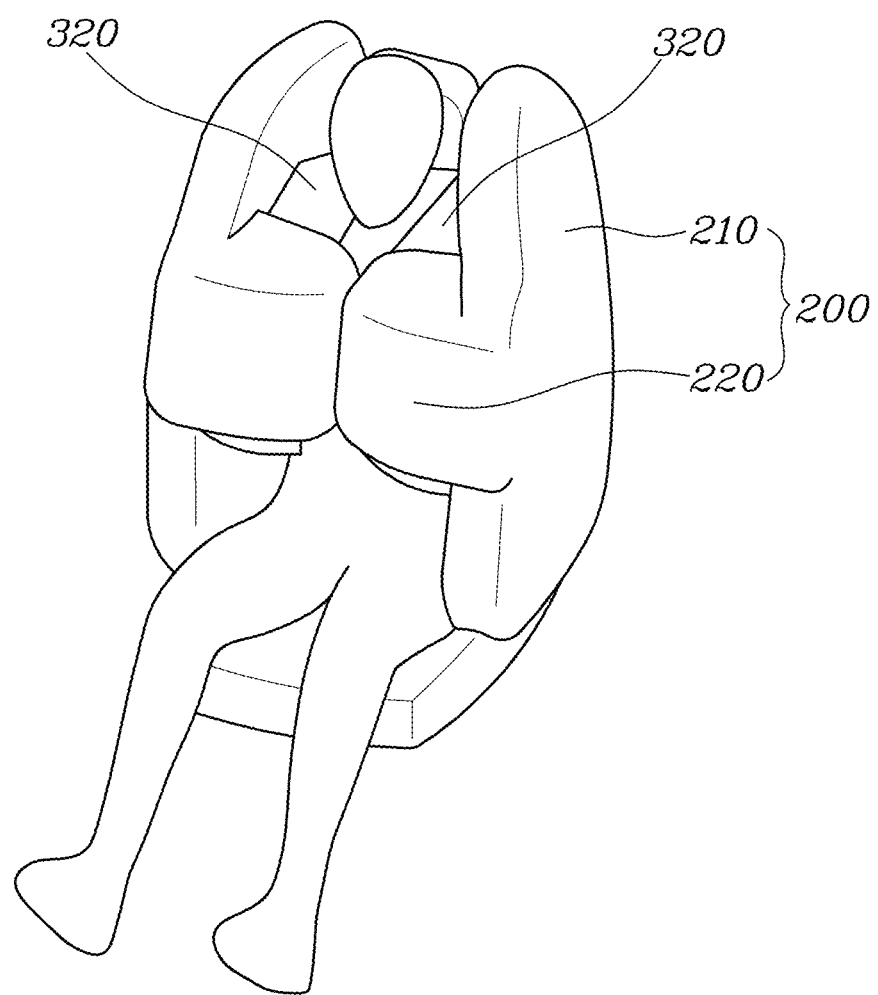
FIG. 9 is a view showing an airbag cushion.

FIG. 1 is a view showing an airbag apparatus for a vehicle according to the present invention. FIGS. 2 and 3 are views showing a cover tether fixation structure according to a first embodiment. FIGS. 4 and 5 are views showing a cover tether fixation structure according to a second embodiment. FIG. 6 is a view showing a cover tether fixation structure according to a third embodiment. FIG. 7 is a view showing an airbag apparatus for a vehicle according to another embodiment of the present invention. FIG. 8 is a view showing the airbag apparatus for a vehicle in FIG. 7. FIG. 9 is a view showing an airbag cushion.

The airbag apparatus for a vehicle according to the present invention includes: an airbag cushion 200 provided at a seat frame 100 and deployed toward a vehicle occupant during a collision; and a cover tether 300 mounted to the seat frame 100 while covering the airbag cushion 200 so that the airbag cushion 200 is compressed and provided at the seat frame 100, the cover tether 300 having a tear line T at some section thereof to be torn due to the deployment force of the airbag cushion 200, as shown in FIG. 1.

The airbag cushion 200 may be of a side airbag deployed toward the side of the occupant, and the seat frame 100 may be a side frame of a seat.

The seat frame 100 has a shape extended from a first side to a second side thereof. The airbag cushion 200 is provided outside a portion between a first end portion 100a and a second end portion 100b of the seat frame 100. An inflator F may be provided at the seat frame 100 to transmit inflation gas to the airbag cushion 200. The inflator F may be fixed inside the seat frame 100 and may be connected to the airbag cushion 200 while passing through the seat frame 100.

Specifically, the present invention includes the cover tether 300 covering the airbag cushion 200 and mounted to the seat frame 100. When the cover tether 300 is mounted to the seat frame 100, the cover tether 300 covers the airbag cushion 200 to press the airbag cushion 200 in a direction toward the seat frame 100, whereby the airbag cushion 200 is compressed and a volume thereof is reduced. As described above, the installation space of the airbag cushion 200 is reduced as the airbag cushion 200 is compressed by the cover tether 300. Therefore, deterioration of the seat exterior design as the airbag cushion 200 exits a seat package area is prevented. The cover tether 300 has the tear line T at a predetermined portion thereof. Therefore, when the airbag cushion 200 is inflated, the airbag cushion 200 may tear out the tear line T and be deployed. The tear line T is spaced apart from the first end portion 300a and the second end portion 300b of the cover tether 300 and is extended to cross the cover tether 300 in a direction perpendicular to the longitudinal direction of the cover tether. When the airbag cushion 200 is deployed, the cover tether 300 is cut by being separated into the first end portion 300a and the second end portion 300b.

As described above, the airbag apparatus of the present invention has the reduced seat package as the size of the airbag cushion 200 folded by the cover tether 300 is reduced, and the airbag cushion 200 is deployed by the tear line T of the cover tether 300 so as to safely protect the occupant in a vehicle collision.

In describing the present invention in detail, the cover tether 300 covers the airbag cushion 200 in a folded state. A first end portion 300a of the cover tether 300 may be removably mounted to the first end portion 100a of the seat frame 100, and a second end portion 300b of the cover tether 300 may be removably mounted to the second end portion 100b of the seat frame 100.

The cover tether 300 may have a polygonal cross-section to cover the folded airbag cushion 200, and the cover tether 300 is easy to be attached to and detached from the seat frame 100, as the first end portion 300a and the second end portion 300b are removably mounted to the seat frame 100. The rigidity of the cover tether 300 increases as the cover tether 300 is provided to cover the airbag cushion 200 and has the polygonal cross-section.

An installation structure of the cover tether 300 may have various embodiments as follows.

The seat frame 100 may have a fixation portion 110 at each of the first end portion 100a and the second end portion 100b. The cover tether 300 may have a locking portion 310 at each of the first end portion 300a and the second end portion 300b so that the fixation portion 110 is lock-connected to the locking portion 310. As the locking portion 310 of the cover tether 300 is lock-connected to the fixation portion 110 of the seat frame 100, mounting convenience is secured by the locking structure. The cover tether 300 is lock-connected to the fixation portion 110 formed on the first end portion 100a of the seat frame 100 by the locking portion 310 of the first end portion 300a. The cover tether 300 may be fixed to the seat frame 100, as the locking portion 310 of the second end portion 300b is lock-connected to the fixation portion 110 formed on the second end portion 100b of the seat frame 100.

As a first embodiment of the fixation structure of the cover tether, the fixation portion 110 is bent inward from the seat frame 100 to form a hook shape, and the locking portion 310 may include a coupling hole 311 in which the fixation portion 110 is inserted.

As shown in FIGS. 2 and 3, the fixation portion 110 is bent inward from the seat frame 100 to form the hook shape and the locking portion 310 has the coupling hole 311. Therefore, the cover tether 300 may be mounted to the seat frame 100 with a locking structure in which the hook is inserted into the coupling hole 311.

The hook constituting the fixation portion 110 and the coupling hole 311 constituting the locking portion 310 may be arranged to be spaced apart from the same intervals and a plurality of hooks and the a plurality of coupling holes may be provided. Accordingly, the locking portion 310 of either the first end portion 300a or the second end portion 300b of the cover tether 300 is lock-connected to the fixation portion 110 of either the first end portion 100a or the second end portion 100b of the seat frame 100. Then, while the cover tether 300 surrounds the airbag cushion 200, the cover tether 300 may be mounted to the seat frame 100 by lock-connection between the locking portion 310 of the remaining end portion of the cover tether and the fixation portion 110.

As a second embodiment of the fixation structure, the fixation portion 110 is bent inward from the seat frame 100 to form the hook shape, and the locking portion 310 includes a plurality of extended portions 312 extended in a longitudinal direction of the cover tether 300 at the first end portion 300a and the second end portion 300b of the cover tether 300, and a fixation rod 313 arranged across the extended portions 312. As the extended portions 312 securely wrap the fixation rod 313, through holes 314 may be formed between the extended portions 312.

As shown in FIGS. 4 and 5, the fixation portion 110 is bent inward from the seat frame 100 to form the hook shape. Therefore, as the fixation portion 110 is bent inward from the seat frame 100 so that interference between the fixation portion 110 and other components including the airbag cushion 200 does not occur. When the extended portions 312 are formed in the locking portion 310 and the extended portion 312 wraps the fixation rod 313, the through holes 314 are formed between the plurality of extended portions 312. Therefore, the cover tether 300 may be mounted to the seat frame 100 to be fixed by a process of inserting the fixation portion 110 into the through hole 314.

Specifically, the locking portion 310 of the cover tether 300 has the shape in which the extended portions 312 wrap the fixation rod 313, so that the fixation rod 313 is brought into contact with the fixation portion 110 of the seat frame 100. The fixation rod 313 is made of a material having rigidity such as metal or plastic, and thus providing contact rigidity between the locking portion 310 of the cover tether 300 and the fixation portion 110 of the seat frame 100. The cover tether 300 is made of a fabric material, and when the cover tether 300 is directly coupled to the seat frame 100 made of steel, the cover tether 300 may be torn. However, the fixation rod 313 may increase durability thereof by securing contact rigidity as the fixation rod 313 is in contact with the seat frame 100.

As a third embodiment of the cover tether, as shown in FIG. 6, the cover tether 300 has hook portions 315 at the first end portion 300a and the second end portion 300b, respectively. The cover tether 300 may be lock-connected to the first end portion 100a and the second end portion 100b of the seat frame 100 via the hook portions 315. The first end portion 300a and the second end portion 300b of the cover tether 300 have the hook portions 315 having a hook shape, and even when the fixation portion 110 of the seat frame 100 maintains an existing shape thereof, the cover tether 300 may be stably mounted to the seat frame 100.

As another embodiment of the present invention, as shown in FIG. 7, the cover tether 300 may include: a first tether 320 of which a first end portion 320a is connected to the seat frame 100 and a second end portion 320b is connected to the airbag cushion 200 so that a deployed location of the airbag cushion 200 is fixed during deployment of the airbag cushion 200; and a second tether 330 of which a first end portion 330a is connected to a second end portion 320b of the first tether 320 and a second end portion 330b is mounted to the second end portion 100b of the seat frame 100 to be fixed, and having the tear line T. The first end portion 320a of the first tether 320 may be fixed to the seat frame 100 with an inflator F or connected to the seat frame with the above-described lock structure. The second end portion 330b of the second tether 330 may be fixed to the seat frame 100 with the above described lock structure. The first tether 320 and the second tether 330 may be integrally formed with each other.

The cover tether 300 includes the first tether 320 and the second tether 330, and the first tether 320 and the second tether 330 mounted the first end portion 100a and the second end portion 100b of the seat frame 100 to press the airbag cushion 200 toward the seat frame 100, whereby the airbag cushion 200 is compressed to reduce the volume thereof. Specifically, as the second end portion 320b of the first tether 320 is connected to the airbag cushion 200, when the airbag cushion 200 is deployed, the first tether 320 fixes the deployment location of the airbag cushion 200 to maintain the deployment shape of the airbag cushion 200. As described above, the first end portion 320a of the first tether 320 of the cover tether 300 is connected to the first end portion 100a of the seat frame 100, and the second end portion 320b of the first tether 320 is connected to the airbag cushion 200 and to the first end portion 330a of the second tether 330. In the second tether 330 of the cover tether 300, the first end portion 330a of the second tether 330 is connected to the second end portion 320b of the first tether 320 and the second end portion 330b of the second tether 330 is mounted to the second end portion 100b of the seat frame 100. Therefore, when the airbag cushion 200 is in a un-deployment state, the first tether 320 and the second tether 330 presses the airbag cushion 200 to allow the airbag cushion 200 to be provided at the seat frame 100 while being in the compressed state. When the airbag cushion 200 is deployed, the tear line T formed on the second tether 330 is cut by the deployment force of the airbag cushion 200, and the first tether 320 and the second tether 330 are separated from each other, and the first tether 320 mounted to the seat frame 100 limits the deployment location of the airbag cushion 200, so that the deployment shape of the airbag cushion 200 may be fixed and maintained.

As described above, the cover tether 300 allows the volume of the airbag cushion 200 to be reduced in the un-deployment of the airbag cushion 200, and maintain the deployment shape of the airbag cushion 200 in the deployment of the airbag cushion 200.

The tear line T is arranged in the second tether 330 to be close to the first end portion 330a, and may be extended across the second tether 330 in a direction perpendicular to the longitudinal direction of the cover tether. When the airbag cushion 200 is deployed, the first tether 320 and the second tether 330 are separated from each other on the basis of the tear line T. When the tear line T is arranged close to the second end portion 330b of the second tether 330, the cut second tether 330 remains at the first tether 320 while the airbag cushion 200 is deployed. Therefore, the second tether 330 may hit the occupant or is blocked with the seat frame 100 and may interfere deployment of the airbag cushion 200. Therefore, it is preferable that the tear line T is arranged close to the first end portion 330a of the second tether 330.

As shown in FIG. 8, the first tether 320 has a seam portion 321 joining a predetermined portion of the first tether 320 in a folded state. As the seam portion 321 is torn due to a deployment force of the airbag cushion 200, an extension length of the first tether 320 is increased. When the airbag cushion 200 is un-deployed, the first tether 320 presses the airbag cushion 200, and when the airbag cushion 200 is deployed, the first tether 320 should fix the deployment location of the airbag cushion 200. Therefore, when the first tether 320 presses the airbag cushion 200, as a connection length thereof with respect to the seat frame 100 becomes shorter, pressure applied to the airbag cushion 200 can be more secured, and when the airbag cushion 200 is deployed, an extension length thereof may be secured in response to the deployment shape of the airbag cushion 200. Therefore, the first tether 320 has the seam portion 321 joining the predetermined portion of the first tether in the folded state, and thus reducing the length thereof by the folded portion, so that the optimum length for pressing the airbag cushion 200 may be set. When the airbag cushion 200 is deployed, the seam portion 321 is torn due to the deployment force of the airbag cushion 200, whereby the folded portion of the first tether 320 is unfolded and the extension length of the first tether 320 increases. Accordingly, the optimum length for maintaining the deployment shape of the airbag cushion 200 may be secured.

As shown in FIG. 9, a main chamber 210 located at a side of the occupant and a sub chamber 220 located in front of the occupant by being bent from a front end portion of the main chamber 210 during deployment of the airbag cushion 200. The first tether 320 is connected to both the main chamber 210 and the sub chamber 220, and may be located above an upper body of the occupant during deployment of the airbag cushion 200.

The airbag cushion 200 includes side airbags. Based on the deployment shape of the airbag cushion, the main chamber 210 is configured to be extended from the pelvis to the head of the occupant, and the sub chamber 220 is configured to be bent toward the front surface of the upper body of the occupant. Specifically, the main chamber 210 and the sub chamber 220 are connected to the first tether 320 so as to fix the deployment location of the airbag cushion, and thus securing the seated occupant.

In addition, when the airbag cushion 200 is deployed, the first tether 320 is located above the upper body of the occupant, and the first tether 320 does not interfere with the occupant so that the main chamber 210 and the sub chamber 220 may be normally deployed. When the airbag cushion 200 is deployed, as the first tether 320 restrains the occupant above the upper body of the occupant, safety of the occupant is improved.

The airbag apparatus for a vehicle, which is configured as described above, protects the occupant from an impact in a vehicle collision and restrains the occupant so as to minimize occupant injuries, and the airbag apparatus of the present invention has improved storage performance of the airbag cushion 200 so as to reduce the seat package volume.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. An airbag apparatus for a vehicle, the airbag apparatus comprising:
    an airbag cushion provided at a seat frame and configured to be deployed toward a vehicle occupant during a collision; and
    a cover tether mounted to the seat frame and configured to cover the airbag cushion so that the airbag cushion is compressed and provided at the seat frame side, the cover tether including a tear line configured to tear due to a deployment force of the airbag cushion,
        wherein the cover tether is configured to cover the airbag cushion in a folded state of the airbag cushion, and wherein the cover tether includes a first end portion that is removably mounted to a first end portion of the seat frame and a second end portion that is removably mounted to a second end portion of the seat frame.

2. The airbag apparatus of claim 1, wherein the seat frame includes fixation portions respectively located at each of the first end portion of the seat frame and the second end portion of the seat frame, and
    the cover tether includes locking portions respectively located at each of the first end portion of the cover tether and the second end portion of the cover tether, wherein the respective fixation portions of the seat frame are lock-connected to the respective locking portions of the cover tether.

3. The airbag apparatus of claim 2, wherein the respective fixation portions are bent inward from the seat frame to form a hook shape, and
    the respective locking portions comprise a coupling hole configured to receive the respective fixation portions.

4. The airbag apparatus of claim 2, wherein the respective fixation portions are bent inward from the seat frame to form a hook shape, and
    the respective locking portions comprise a plurality of extended portions respectively formed at the first end portion and the second end portion of the cover tether and extended in a longitudinal direction of the cover tether, the locking portions comprising a fixation rod arranged across each of the extended portions, and as the extended portions wrap the fixation rod to fix the fixation rod, through holes are formed between the plurality of extended portions.

5. The airbag apparatus of claim 1, wherein the cover tether comprises hook portions at the first end portion of the cover tether and the second end portion of the cover tether, and the cover tether is lock-connected to the first end portion of the seat frame and the second end portion of the seat frame by the hook portions.

6. The airbag apparatus of claim 1, wherein the tear line is located at a portion spaced apart from the first end portion and the second end portion of the cover tether and is extended across the cover tether in a direction perpendicular to a longitudinal direction of the cover tether.

7. The airbag apparatus of claim 1, wherein the cover tether comprises:
    a first tether of which a first end portion is connected to the seat frame and a second end portion is connected to the airbag cushion, so that a deployed location of the airbag cushion is fixed during deployment of the airbag cushion; and a second tether of which a first end portion is connected to the second end portion of the first tether and a second end portion is securely mounted to the second end portion of the seat frame, the second tether including the tear line.

8. The airbag apparatus of claim 7, wherein the tear line is arranged in the second tether at a portion adjacent to the first end portion of the second tether, and is extended across the second tether in a direction perpendicular to a longitudinal direction of the cover tether.

9. The airbag apparatus of claim 7, wherein the first tether is in a folded state at a predetermined portion thereof and includes a seam portion allowing the folded portion to join, and as the seam portion is torn due to the deployment force of the airbag cushion, an extension length of the first tether is increased.

10. The airbag apparatus of claim 7, wherein the airbag cushion comprises a main chamber located at a side of the occupant and a sub chamber located in front of the occupant formed by being bent from a front end portion of the main chamber during deployment of the airbag cushion, and the first tether is connected to both the main chamber and the sub chamber and is configured to be located above an upper body of the occupant during deployment of the airbag cushion.

\* \* \* \* \*